(12) United States Patent
Adams et al.

(10) Patent No.: US 12,297,673 B2
(45) Date of Patent: May 13, 2025

(54) ADJUSTABLE TAMPER-RESISTANT LOCKING MECHANISM FOR MANHOLE COVER

(71) Applicant: Betts Industries, Inc., Warren, PA (US)

(72) Inventors: David Adams, Warren, PA (US); Michael Gustafson, Clarendon, PA (US); Craig Culbertson, Russell, PA (US)

(73) Assignee: Betts Industries, Inc., Warren, PA (US)

( * ) Notice: Subject to any disclaimer, the term of this patent is extended or adjusted under 35 U.S.C. 154(b) by 0 days.

(21) Appl. No.: 18/197,457

(22) Filed: May 15, 2023

(65) Prior Publication Data
US 2023/0366245 A1 Nov. 16, 2023

Related U.S. Application Data

(60) Provisional application No. 63/341,743, filed on May 13, 2022.

(51) Int. Cl.
*E05B 83/02* (2014.01)
*B60P 3/22* (2006.01)
(Continued)

(52) U.S. Cl.
CPC .............. *E05B 83/02* (2013.01); *B60P 3/226* (2013.01); *B60P 3/228* (2013.01); *B65D 90/10* (2013.01);
(Continued)

(58) Field of Classification Search
CPC ........ E05B 83/02; E05B 85/243; E05B 85/26; E05B 65/006; B60P 3/226; B60P 3/228;
(Continued)

(56) References Cited

U.S. PATENT DOCUMENTS 7,033,489 B2 * 4/2006 Thompson ................ E03F 5/06
210/474
7,127,849 B1 * 10/2006 Gayer ................ E05D 13/1276
49/386
(Continued)

FOREIGN PATENT DOCUMENTS

CN 113123674 A 7/2021
KR 100782170 B1 11/2007

OTHER PUBLICATIONS

Betts Industries—Non-ASME, 30", 5 Hold Down, 10 psi MAWP. Model 8535 Parts Numbers; Oct. 25, 2020.
(Continued)

*Primary Examiner* — Kareen K Thomas
(74) *Attorney, Agent, or Firm* — Hahn Loeser & Parks LLP

(57) ABSTRACT

This disclosure includes a manhole cover locking device, system, and kit, each configured for locking a manhole cover in a closed position overtop an access opening of a container, the access opening being arranged at one end of a collar extending outwardly from the container, each comprising: a body; a mechanism for connecting the body to a pre-existing portion of the manhole collar or the container; and, a mechanism for securing the body to the manhole cover to prevent the opening of the manhole cover using a pre-existing portion of the manhole cover. Each mechanism may be tamper resistant. The disclosure also includes methods of installing and using the device, system, and kit.

21 Claims, 8 Drawing Sheets

(51) Int. Cl.
  *B65D 90/10* (2006.01)
  *E05B 85/24* (2014.01)
  *E05B 85/26* (2014.01)
  *F16J 13/16* (2006.01)

(52) U.S. Cl.
  CPC ............ *E05B 85/243* (2013.01); *E05B 85/26* (2013.01); *F16J 13/16* (2013.01); *B65D 2590/666* (2013.01)

(58) Field of Classification Search
  CPC .... B65D 90/10; B65D 2590/666; F16J 13/16; F16J 13/06; E05C 3/24
  See application file for complete search history.

(56) References Cited

U.S. PATENT DOCUMENTS

| | | | |
|---|---|---|---|
| 7,160,051 B1* | 1/2007 | Cuny | ............... E02D 29/14 404/25 |
| 8,057,123 B2 | 11/2011 | Monneret | |
| 8,226,169 B2 | 7/2012 | Kreuels et al. | |
| 8,342,605 B2 | 1/2013 | Tanaka et al. | |
| 10,486,561 B2 | 11/2019 | Shirai et al. | |
| 11,167,668 B2 | 11/2021 | Kondo | |
| 2006/0127178 A1* | 6/2006 | Akkala | ............... E02D 29/1463 404/25 |
| 2010/0052394 A1 | 3/2010 | Heeg et al. | |
| 2015/0083022 A1* | 3/2015 | Douglas | .................. B61D 5/08 105/377.07 |
| 2016/0214792 A1* | 7/2016 | David | .................... B65D 90/10 |

OTHER PUBLICATIONS

Betts Industries—Engineerling Bulletin: Maintenance and Use of Betts Full Opening Pressure Manhole; Feb. 2021.

Betts Industries, 20", 6 Hold Down, 35 psi MAWP. Model 8555 Specification—Oct. 27, 2020.

Mena Report; Retrofitting Various OnGoing Water Supply Schemes, Aug. 13, 2022.

* cited by examiner

ADJUSTABLE TAMPER-RESISTANT LOCKING MECHANISM FOR MANHOLE COVER

CROSS-REFERENCE TO RELATED APPLICATIONS

This application claims the benefit of, and priority to, U.S. Provisional Patent Application No. 63/341,743, filed with the U.S. Patent and Trademark Office on May 13, 2022, which is hereby incorporated by reference.

BACKGROUND

In the cargo tank industry, manholes are used to provide access into the cargo container (tank) for inspection and maintenance. Existing manholes do not include an integral system to ensure that a particular manhole is both locked and tamper resistant. Presently, security or safety seal tabs may be affixed to the manhole, providing a simple manner of indicating that a manhole has not been tampered with or opened. These devices are not integral with the manhole and can be easily removed or broken. As a result, such devices are not tamper resistant, as such devices do not prevent theft or product tampering.

Alternatively, cables and locks can be used to ensure that a particular manhole is locked and tamper resistant, but again, the cables and locks are not integral with the manhole. These systems present their own challenges, such as requiring manual locking and cable placement. Accordingly, there is a need for a manhole cover locking device, system, and method that is tamper resistant and utilizes existing features associated with a manhole cover and surrounding structure associated with the cargo container. For example, such devices, systems, and methods may provide a retrofit for an extending cargo container.

The disadvantages of these systems, and the noted deficiencies to lock and prevent tampering, are overcome and achieved by the devices, systems, and methods presented and described herein.

SUMMARY OF THE INVENTION

The present invention concerns devices, systems, and methods for locking a manhole cover in its closed position as described herein, and which may be provided in a manner that is tamper resistant. Such invention utilizes a device that secures to existing features of the manhole cover, collar, and other surrounding structure associated with the manhole or cargo container. By using existing features or components of the manhole, including the cover and collar, any manufacturer warranties for the manhole and/or corresponding container would not be voided, which could otherwise be voided if modifying the manhole cover, collar, or associated container to add features or components or modify existing features or components of the manhole cover, collar, or associated container. Aspects may be retrofit to accommodate such device.

Embodiments include the installation or use of the device, as methods. In such embodiments, prior to installing the manhole cover locking device, the manhole cover may already be closed and secured to cover the manhole opening, and which may even be sealed in such an arrangement. Closure of the manhole cover in a secured arrangement may be accomplished using any desired manhole cover closure system or mechanism. Further embodiments include the provision of the device and its components in the form of a kit or system for use with a manhole (manhole cover and any collar) associated with a container, where portions of the device may be provided unassembled.

In a particular embodiment, a locking device utilizes a mechanical latch, spring and piston attached to an existing manhole cover by means of a retrofittable swing bolt pin (threaded rod) and additional components. The locking device with latch are secured to a lug associated with the manhole cover by way of a threaded rod, while the latch is configured to receive and interlock with a manhole cover handle. The locking device provides adjustability, as well as variation in the manhole cover configuration variation, such as to account for any variation in the configuration of the handle with respect to the manhole lugs. This adjustability can also facilitate the application of a compression force to the manhole cover to squeeze a gasket surrounding the manhole opening, further facilitating manhole sealing capabilities. In a particular embodiment, the latch is designed so that when a piston is not actuated, a spring retracts the piston into a retracted position within the locking device body (block). The piston in the retracted position provides interference with the latch providing a locked position. This locked position is achieved by the position of the piston relative to the locking device body. As the piston is actuated, the interference with the latch is removed and the latch is able to be freely moved or pivoted within the confined limits of the body (block) of the locking device to an open position. The opened position is achieved by the position of the piston relative to the locking device body. An additional spring and ball push up on the latch to keep the latch in the open position when the weight of the manhole cover is removed.

In another embodiment, the locking device is mounted to lugs associated with a hinge of the manhole cover, with a rod extending above the topside of the hinge to prevent each of the hinge and the manhole cover from opening.

Other variations and embodiments other than those shown or discussed herein may be employed, where the features and configurations of the devices, systems, and methods may be changed or altered in various manners without departing from the scope of this invention.

BRIEF DESCRIPTION OF THE DRAWINGS

The foregoing and other objects, features, and advantages will be apparent from the following more detailed descriptions of particular embodiments, as illustrated or exemplified in the accompanying drawings wherein like reference numbers, symbols, or the like represent like parts, features, or characteristics of particular embodiments.

DETAILED DESCRIPTION OF PARTICULAR EMBODIMENTS

Figure 13:
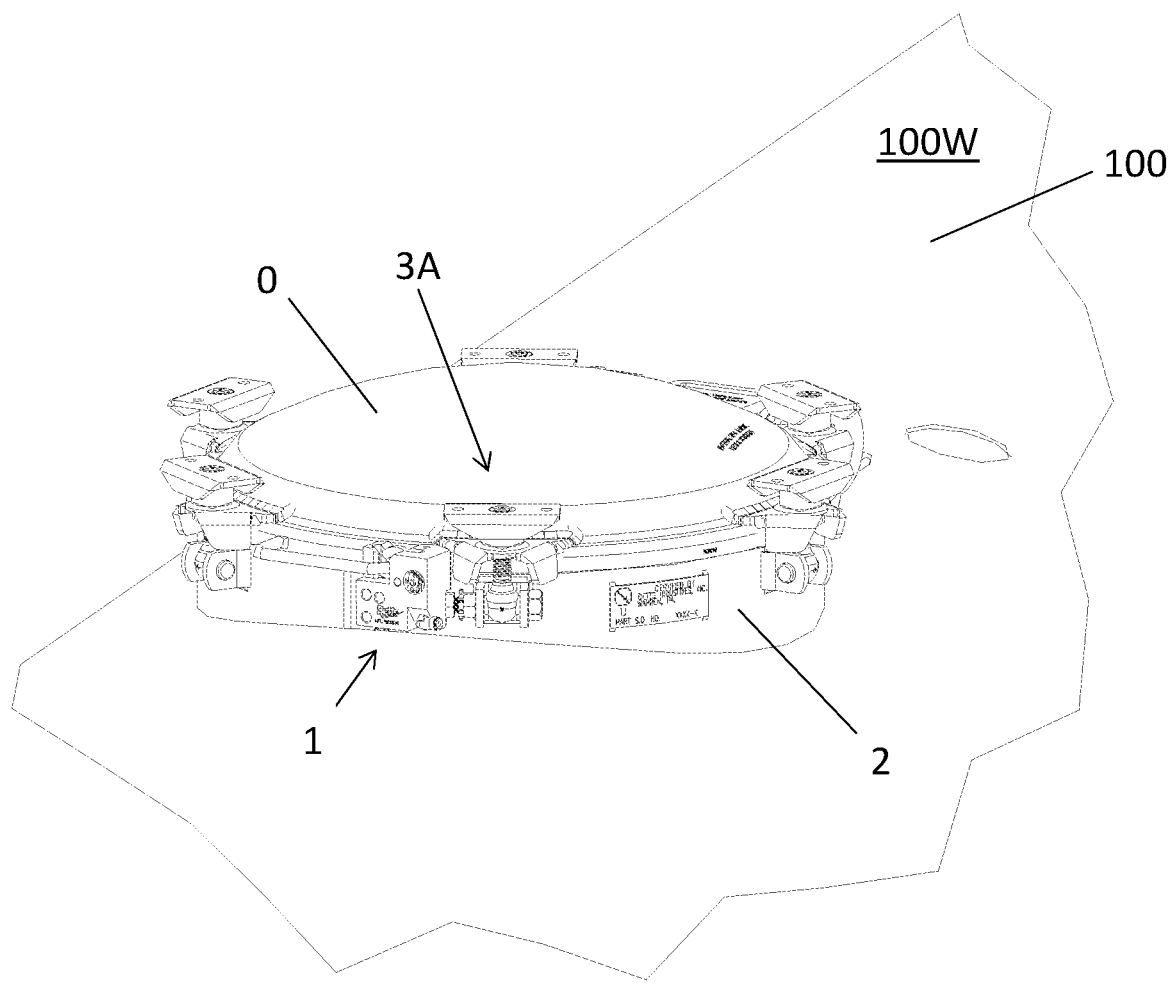

Cargo containers, which includes tanks and vessels, which may or may not form a portion of a truck, trailer, or other vehicle, includes a manhole forming an opening to view or otherwise access the storage volume provided in the container. Such containers may store any desired matter, including liquids or gases. In certain instances, a collar, which generally forms a tube or the like, extends or projects outwardly from the container to a terminal end having an opening forming the manhole. The collar is often annular in cross-section, but may comprise any other desired cross-section, including rectangular, for example. A manhole cover (lid) is arranged along the opening. The manhole cover may or may not be pivotable between open and closed arrangements, where the manhole cover covers and closes the opening in the closed position and opens the opening in the open position to provide access. Manholes (cover and collar) may be made of any suitable material, which is often steel or stainless steel. With reference to an exemplary embodiment in FIG. 1, a manhole is generally shown, which includes a manhole cover 0 arranged overtop a manhole opening (not shown) and along a collar 2 forming the manhole opening. The collar 2 extends from a container 100 (shown in FIG. 13, by example), which also shows an exterior wall 100W of container 100. Manhole cover 0 also includes a handle 5, hinge 23, and a manhole cover closure system comprising a plurality of swing bolt latches 3A. The manhole cover 0 is shown in a closed arrangement, secured in the closed arrangement by the closure system and its swing bolt latches 3A.

Particular embodiments provide manhole cover locking device, which may also be a tamper resistant. The locking device locks the manhole cover in its closed, secured arrangement. The locking device includes a body containing certain features or mechanisms for: (1) securing the locking device to at least one component of, or that which is connected to, the manhole collar or of the container, or any component attached to either the manhole collar or the container; and, (2) preventing the opening of the manhole cover using mechanical interference with the manhole cover or a component of, or that which is connected to, the manhole cover. Body may be formed of any suitable, rigid and durable material, such as aluminum, steel, or plastic. By use of the manhole cover locking device, the manhole cover is locked in a closed position, which may be also achieved by a separate manhole closure feature or system. The features of the locking device that achieve (1) and (2) above may be configured to be tamper-resistant, to provide secure locking capabilities. Once installed, the locking device is tamper resistant but may be released from its locked configuration. For example, this release may be achieved in the embodiments described herein in association with the figures by remotely controlling the piston described in each embodiment, by remotely controlling the movement of the piston from a mechanically interfering position (e.g., with regard to a latch in one embodiment and with regard to a hinge portion connected to the manhole cover in another embodiment).

Figure 1:
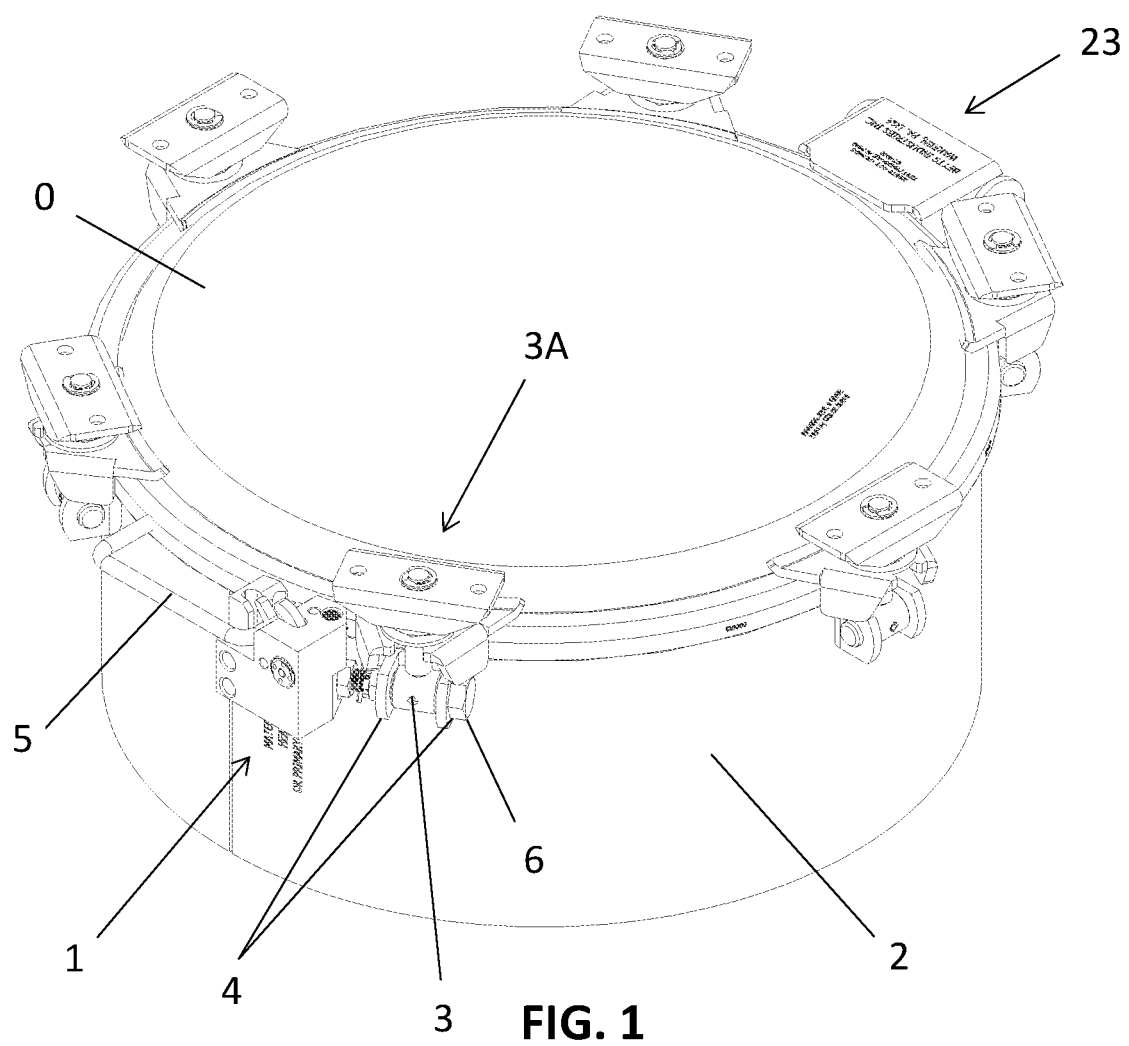
FIG. 1 is a top perspective view of a manhole with a manhole cover arranged in a closed position with a manhole cover locking device arranged in association with a swing bolt, in accordance with a particular embodiment.
Figure 2:
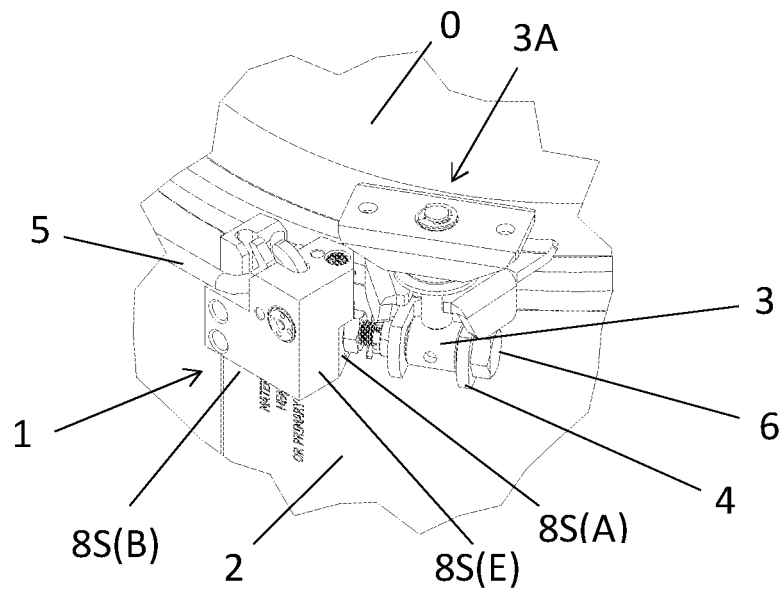
FIG. 2 is a close-up view of FIG. 1, showing a manhole cover locking device installed to secure the manhole cover in the closed position to a collar associated with the manhole, in accordance with the embodiment of FIG. 1.
Figure 3:
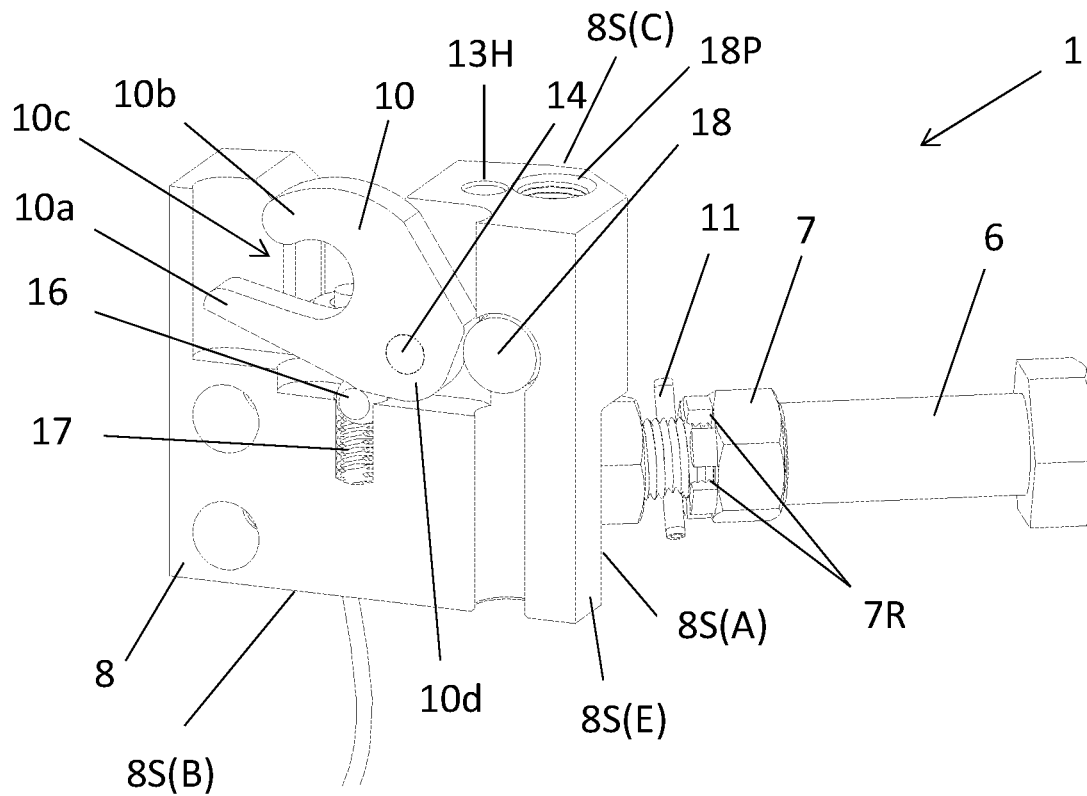
FIG. 3 is a sectioned view of the manhole cover locking device arranged in a closed position, in accordance with the embodiment of FIG. 1.
Figure 4:
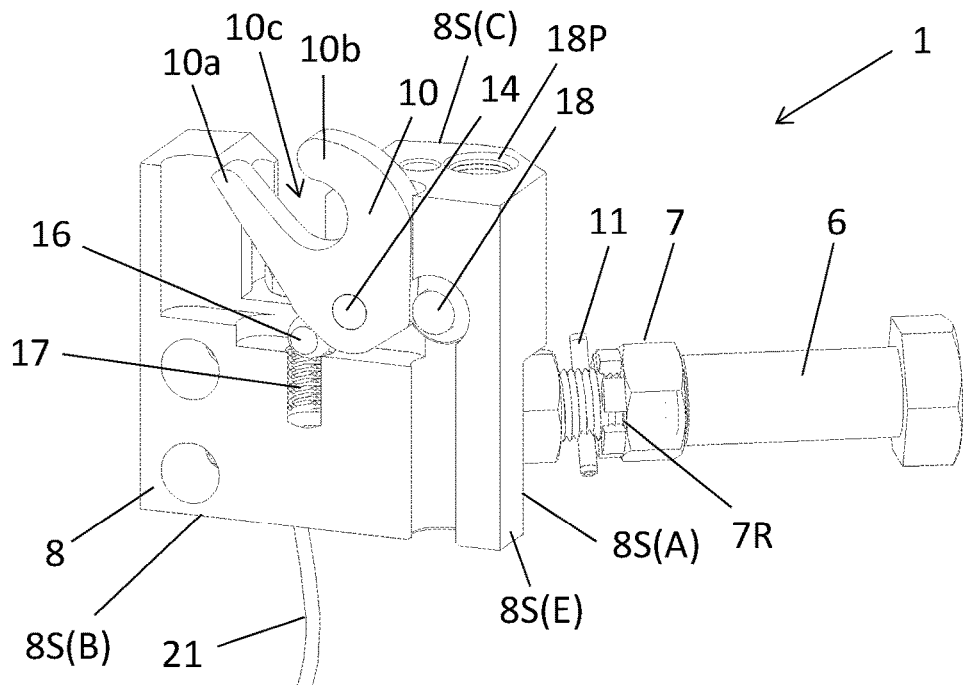
FIG. 4 is a sectioned view of the manhole cover locking device arranged in an open position, in accordance with the embodiment of FIG. 1.
Figure 5:
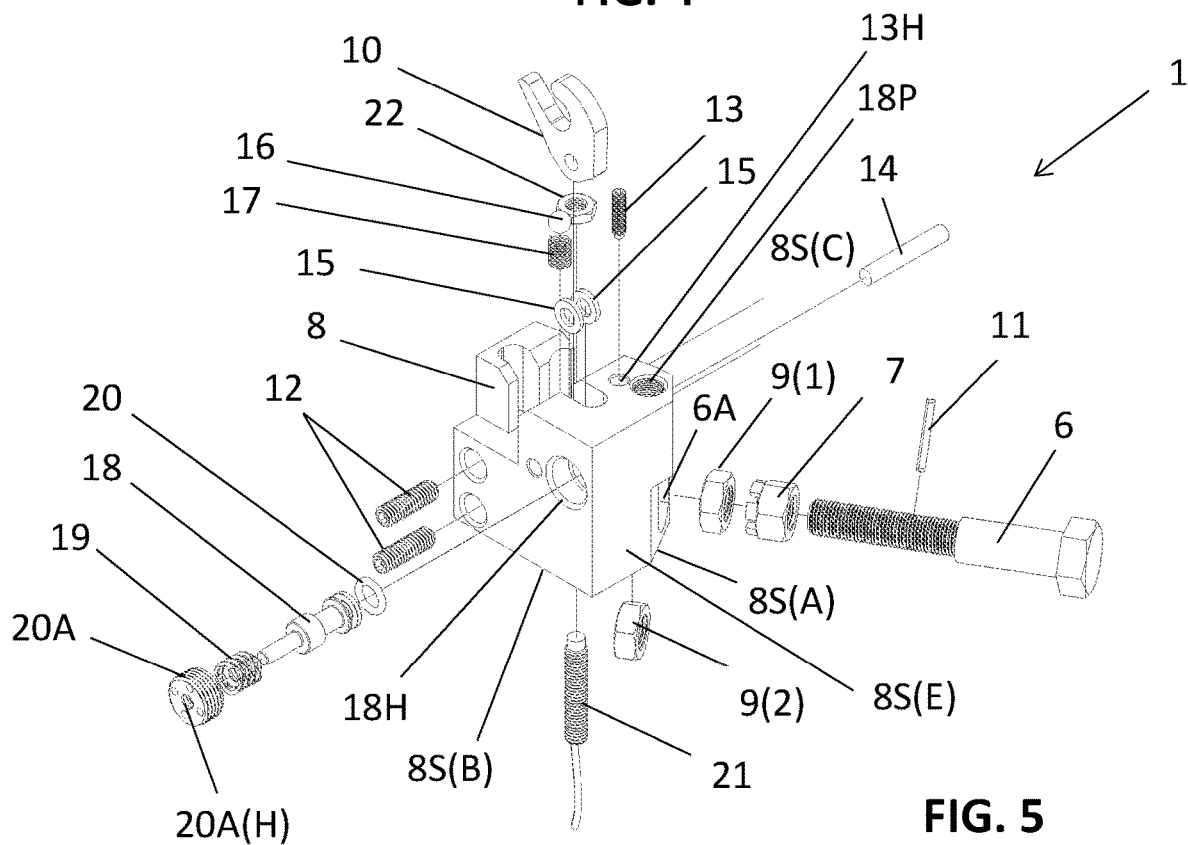
FIG. 5 is an exploded view of the manhole cover locking device, in accordance with the embodiment of FIG. 1.

With reference to FIGS. 1-2, an exemplary manhole cover locking device 1 is shown in an installed arrangement, rigidly securing cover handle 5 to a rod 6 extending from the cover closure system and a swing latch 3A. In particular embodiments, such as shown in FIGS. 3-5, the manhole cover locking mechanism 1 includes a latch 10, pivotable between an open (unsecured) position (see FIG. 3) and closed (secured) position (see FIG. 4). In the open position, the latch 10 is configured to receive a portion of the manhole cover 0, such as handle 5, for example. In the closed position, the latch 10 is configured to secure the portion of the manhole cover 0 within the locking device 1. In the embodiment shown, the latch 10 is pivotable along an annular elongated member 14, such as a pin or rod. Optional washers 15 (or sleeves or other like structure) maintain the latch 10 generally centered within a void in the locking device body 8. In the embodiment shown, the latch 10 is generally U-shaped. More specifically, in this embodiment, the U-shaped latch 10 has a downside portion 10a that sits lowest when in the closed arrangement and an upside portion 10b opposite the downside portion and adjacent a central recess 10c configured for receiving the portion of the manhole cover 0. In other words, the downside 10a and the upside 10b form the opposing vertical arms of the "U," while the bottom of the "U" is referred to as the bottom side 10d of the latch 10. In the embodiment shown, the upside 10b has a hook-shape, for the purpose of better capturing and securing the portion of the manhole cover 0 received by the latch 10.

The latch 10 may be biased in an open (unsecured) arrangement. In the exemplary embodiment shown in FIGS. 3-5, the latch 10 is spring loaded (with a ball 16 separating the spring 17 from the latch 10), biasing the latch 10 in open (unsecured) position as exemplarily shown in FIG. 4. The spring is 17 positioned to apply force to the latch downside 10b to maintain the latch 10 in the open position, but other configurations may be employed to achieve the desired purpose of biasing a latch in an open arrangement. The spring 17 is selected so to permit the latch 10 to close due to the weight of the manhole cover 0 when the portion of the manhole cover is received by the latch 10, but to also pivot the latch 10 to the open position when the manhole cover 0 is lifted from the closed position. In the embodiment shown in FIGS. 1-2, handle 5 forms the portion of the manhole cover 0 received by the latch 10, which is a pre-existing component of the manhole cover. Of course, other portions of the manhole cover 0 may be employed in substitute for the handle 5 in other embodiments. For example, the other portions may be currently existing (pre-existing) features of the manhole cover 0 or portions that are added to the manhole cover for the purpose of being secured by the latch 10. The preference is to utilize pre-existing features or components (structure) of the manhole cover without adding any new structure to the manhole cover or the surrounding structure associated with the manhole cover, such as the collar or the container.

Figure 9:
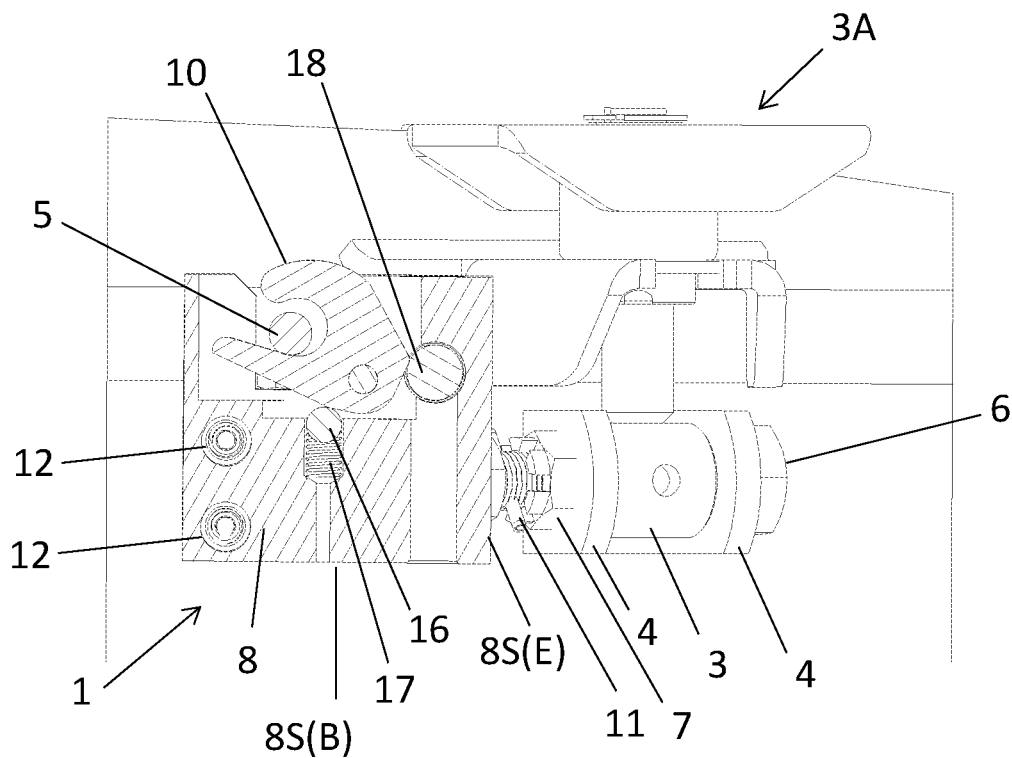
FIG. 9 is a cross-sectional side view of the manhole cover locking device installed to secure the manhole cover in the closed position to a collar associated with the manhole, in accordance with the embodiment of FIG. 1.
Figure 10:
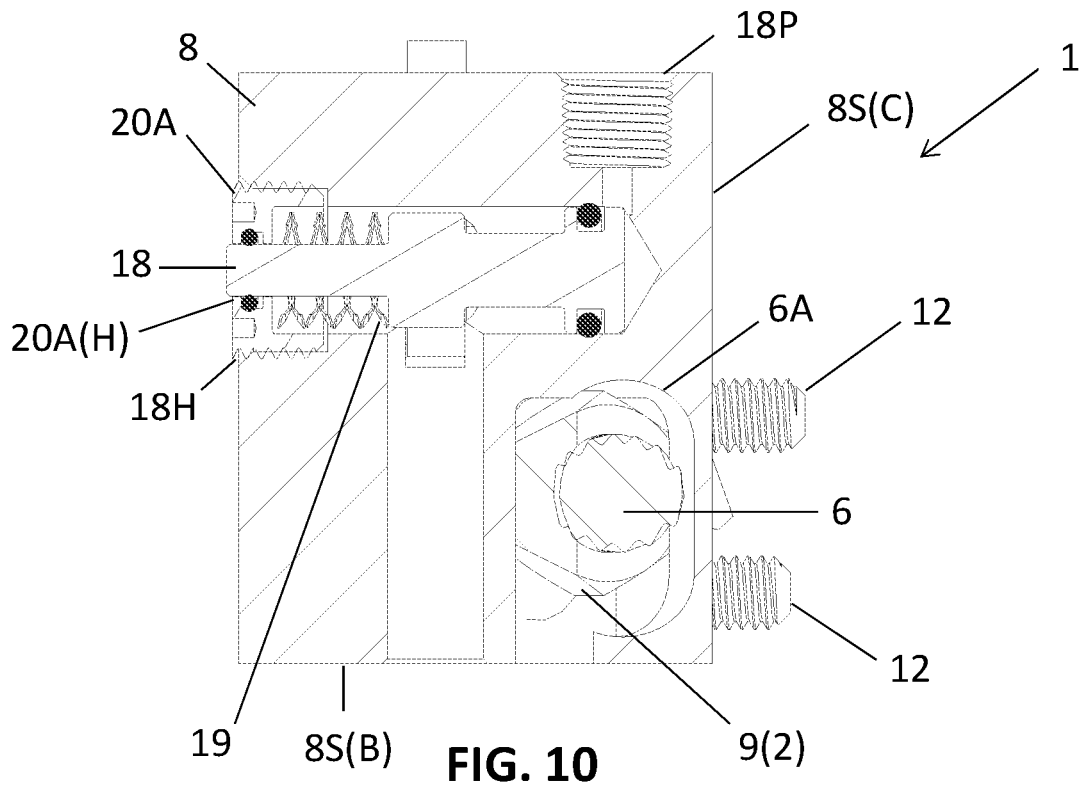
FIG. 10 is a cross-sectional end view of the manhole cover locking device installed to secure the manhole cover in the closed position to a collar associated with the manhole, in accordance with the embodiment of FIG. 1.
Figure 11:
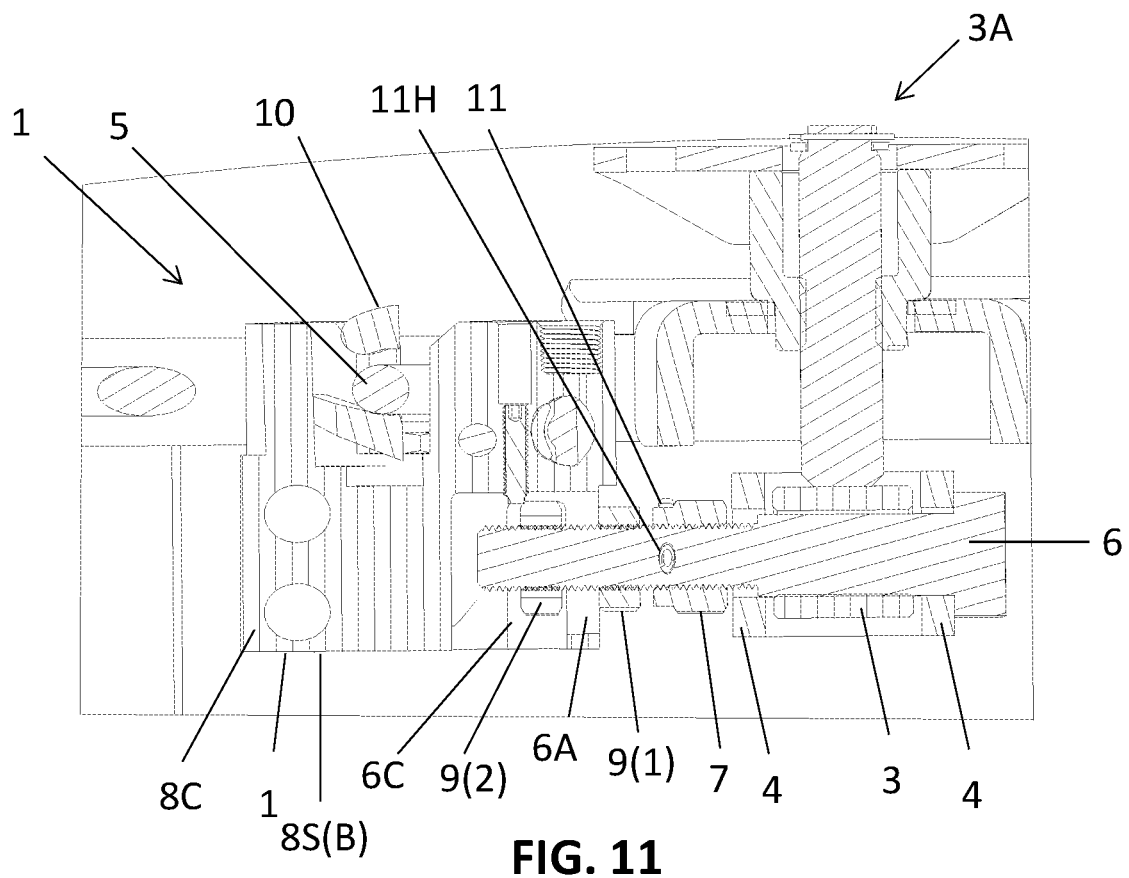
FIG. 11 is a cross-sectional side view of the manhole cover locking device installed to secure the manhole cover in the closed position to a collar associated with the manhole, in accordance with the embodiment of FIG. 1.
Figure 12:
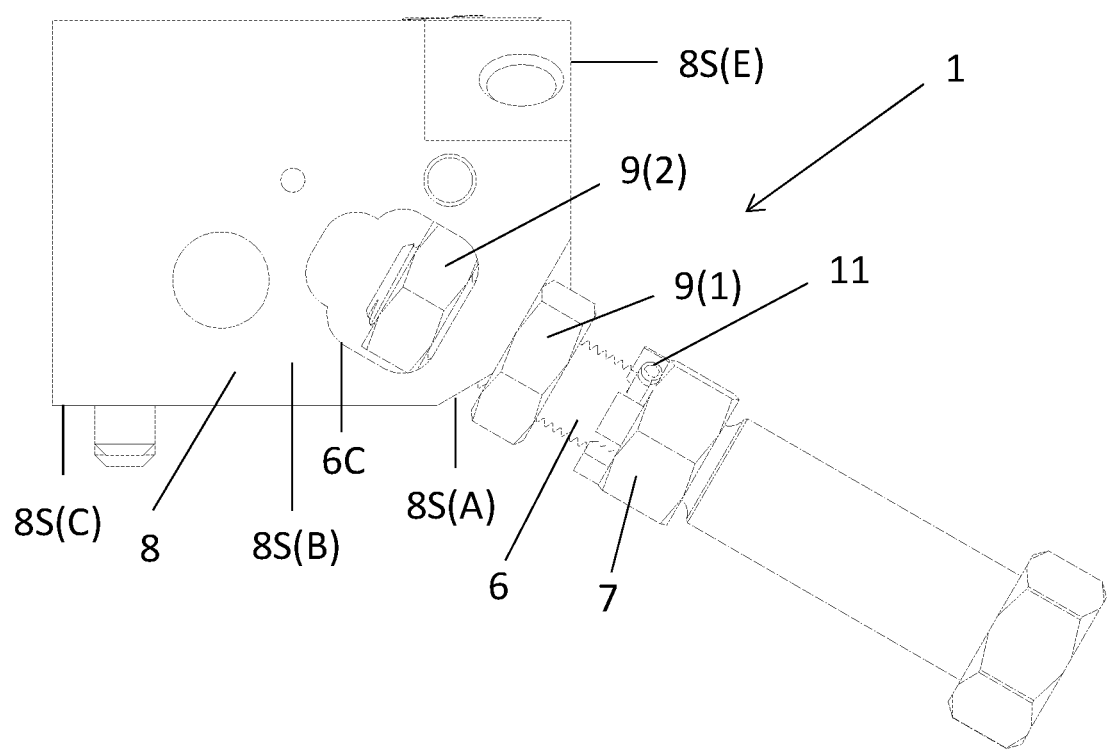
FIG. 12 is a bottom view of the manhole cover locking device in an installed or closed configuration, in accordance with the embodiment of FIG. 1; and, FIG. 13 is a top perspective view of a manhole cover locking device installed to secure a manhole cover in a closed position to a collar associated with the manhole, showing the bottom side of the device in close proximity to or adjacent to the cargo container along its wall, in accordance with the embodiment of FIG. 1.

A latch locking mechanism of the manhole cover locking device is arranged in a configuration relative to the latch for the purpose of maintaining (locking) the latch in a closed (secured) position, and which may be tamper resistant. The latch locking mechanism may comprise or utilize any known manner for preventing movement or rotation of the latch. For example, the latch locking mechanism may operate based upon mechanical interference or magnetism principles. In the embodiment shown in FIG. 3, a piston 18 is positioned in a locking configuration to maintain (lock) the latch 10 in the closed (securing) position. The piston 18 is movable or retractable between a locked position (see FIG. 3) and an unlocked position (see FIG. 4). The piston 18 may be a pin, rod, or other structure suitable for the purpose of maintaining the latch 10 in the closed position by mechanical interference. In one embodiment, such as in the embodiment shown in FIGS. 3-5 and more closely in FIGS. 9-10, the piston 18 is air driven, meaning, it is operated between extended and retracted positions using pressurized air and a spring 19 (e.g., a return spring), where the spring 19 biases the piston 18 in a locked position to lock the latch and the pressurized air actuates the piston 18 to release (unlock) the latch 10 and place the latch 10 in an open position. An inlet port 18P is arranged in the body 8 to supply pressurized air from a pressurized air source (not shown), allowing for actuation of the piston 18. An O-ring seal 20 is provided to ensure a proper seal and prevent the leakage of air. In this embodiment, the piston 18 is in a retracted position when in the locked position, and in an extended position when in the open position. In other variations, it is possible for the piston 18 to be in an extended position when in the locked position, and in a retracted position when in the open position. In lieu of pressurize air, the piston may also be operated by other means, such as, for example, electrical, magnetic, or pneumatic operation. As such, in such embodiments, the manhole cover locking device includes or is arranged in communication with a latch locking drive source, such as a pressurized air source, an electronic source, or a pneumatic source. In sum, any actuator may be employed to operate a piston, rod, pin, or other such structure as contemplated herein. The latch locking mechanism is positioned to physically, through mechanical interference, prevent the latch from substantially moving from its closed (locked) position. In the embodiment shown in FIG. 3, the piston 18 of the latch locking mechanism is positioned along, or closely to, a bottom side 10d of the latch 10 when the latch 10 is in the closed position. It is contemplated, however, in other embodiments not shown, that the piston may be arranged along, or closely positioned to, other portions of the latch to maintain it securely in a closed position. It is also contemplated that the piston may be arranged to engage any portion of the latch or any component attached thereto or to penetrate a recess or aperture arranged in or through the latch or a component thereof to achieve the desired mechanical interference. To prevent tampering with the latch locking mechanism, in particular embodiments, including the embodiment shown in FIG. 5, a tamper resistant plug 20A is employed to cap a hole 18H within which the piston 18 is arranged (by inserting plug 20A into hole 18H after inserting piston 18 and any other components associated with piston 18 into hole 18H), which also aids in maintaining the piston 18 positionally within the hole 18H. Optionally, a central hole 20A(H) is provided in the plug for a portion of the piston to protrude, to indicate whether the piston is in a locked or unlocked position. Of course, other tamper resistant mechanisms, such as a plate, for example, may be employed to restrict access to the piston or any other latch locking mechanism employed. Tamper resistant plug may be formed of any suitable material, including any elastomeric material (that provide elastic properties), plastic(s), fiberglass, and/or metal, for example. The plug may be retained by friction and/or expansive forces (such as due to any compression placed on the plug, such as when it is oversized for the hole), or threading, for example. A lock may even be used with, or form as, a plug. Plug may also be fixed in place, either permanently or temporarily using an adhesive, weld, or by any other suitable material or composition (referred to as an affixing composition).

In particular embodiments, the manhole cover locking device includes one or more collar-engaging members configured to extend from the body and forcefully engage the collar on the collar-facing side of the body. By doing so, a force is applied to the collar, which then forces the manhole cover locking device in an outward direction relative to (outwardly, away from) the collar, which in turn creates and imparts a moment on the rod (e.g., rod 6) received by the manhole cover locking device. By doing so, tension is placed on the connections between the manhole cover locking device and the manhole cover, maintaining tight and rigid connections and as an overall assembly. In the embodiment shown in FIGS. 5, 9, and 10, one or more collar-engaging members 12 are arranged in corresponding holes extending through the body 8 along a collar-facing side 8S(C), from which the members 12 are configured to protrude. (In FIG. 5, the collar-engaging members 12 are shown arranged along a side of the body facing away from the collar-facing side 8S(C); however, the holes within which the members 12 are arranged extend through the body and to the collar-facing side 8S(C), which permits one to access one end of the members to facilitate the selective movement of the members 12 through the corresponding holes and to extend outwardly from collar-facing side 8S(C) to engage the collar during installation.) In the embodiment shown, the one or more collar-engaging members 12 are set screws, although any other suitable device(s) or component(s) may be employed in substitute for, or in addition to, the set screws. For example, bolts, other types of screws, or any suitable actuator may be employed. It is appreciated that the location of the collar-engaging members may be symmetrical or asymmetrical arrangement along the collar-facing side of the body.

In particular embodiments, the body is configured to connect to a rod extending from a portion of manhole cover or surrounding structure, which includes the manhole collar or the cargo container. This rod may be a retrofit or substitute for a rod originally provided with the cargo container or, more specifically, with the manhole cover or collar. In specific embodiments, the body, in being configured to connect with a rod, the body is configured to receive and secure and a rod associated with a manhole cover, which includes being associated with a manhole cover closure system, a manhole collar, or the cargo container. In particular embodiments shown in FIGS. 3-5 and 11, in being configured for receiving a rod 6, the body 8 includes an aperture 6A. In other variations, a recess may be provided in lieu of an aperture, such as when securing a rod by other means, such as by one or more set screws, a pin, or a clip, for example. Referring again to the embodiment shown, the rod 6 is threaded for receiving securing nuts 9(1), 9(2), although, in other variations, a rod may not be threaded when being secured to the body by other means, such as by one or more screws, a pin, or a clip, for example. Removable welds, adhesives, or any other securing compositions or mechanisms may also be used. In particular embodiments, the body includes an aperture 6A extending into the body 8 and to a cavity 6C arranged within the body 8 and in communication with the aperture 6A, where such cavity 6C forms a recess or slot, for example, in the body 8. In certain instances, the aperture 6A is smaller than cavity 6C (e.g., in cross-section), so that the second nut 9(2) resists removal of rod 6 by not permitting the second nut 9(2) to pass through aperture 6A after second nut 9(2) is installed on rod 6. The aperture 6A may be annular (forming a hole) or elongated (forming a slot), where the slot provides adjustability, permitting the manhole cover locking device 1 to be used to accommodate different configurations or situations. In use, a threaded portion of a rod 6 (e.g., a rod end) extends into and through the aperture 6A and into the corresponding cavity 6C. The threaded portion includes a first nut 9(1) prior to inserting the rod 6 into the aperture 6A. A second nut 9(2) is placed within the cavity 6C and threaded onto the rod 6 during or after insertion. The first and second nuts 9(1), 9(2) are ultimately rotated into a position snug against the body 8 on opposite ends of the aperture 6A for the purpose of securing the rod 6 to the manhole cover locking mechanism. If nuts 9(1), 9(2) are too small to properly engage the body on any side of aperture 6A, one or more washers may be placed between any nut and the aperture 6A to better engage the surrounding body. This is performed after the rod 6 has been secured in place along the manhole cover, collar, or other surrounding structure. Because the first and second nuts 9(1), 9(2) (forming a "pair of nuts") may be arranged at different locations along the length of the rod 6, the pair of nuts provide adjustability to permit installation of the manhole cover locking device 1 in different configurations by providing adaptability and adjustability, such as to adapt to different variations in the arrangement of existing manhole handles 5 and lug 4 locations. This adjustability also allows the locking device 1 to be adjusted to set the swing latch of the manhole closure system in a proper position. In the embodiment shown in FIGS. 1-2, the rod 6 extends through a plurality of lugs 4. Lugs 4 are tabs or arm-like structure extending outwardly from the collar 2, each lug 4 having an aperture through which the rod 6 extends. A set screw 13 or the like may be arranged within the body 8 via a corresponding hole (aperture) 13H overtop the second nut 9(2) in cavity 6C, with the set screw being employed to contact and apply a force for adjusting the height of the body 8 relative to the second nut 9(2) and the corresponding rod 6. The rod 6 includes a mechanism for securing the rod 6 into position relative to the plurality of lugs 4. In the embodiment shown in FIGS. 3-5, the mechanism comprises a castle nut 7 and lock pin 11, where the castle nut 7 is rotated and snugged against the exterior side of a lug 4, or any intervening structure, such as a washer or nut, facing the manhole cover locking device 1. Once snug, pin 11 is inserted into a hole 11H extending through the rod 6 such that opposing protruding end portions of the pin 11 are arranged within one of a plurality of recesses 7R spaced around the perimeter of the castle nut 7 so to prevent loosening of the castle nut 7 and loosening of the rod 6 from its arrangement within the manhole cover lugs 4. The rod may form a bolt or other suitable alternative in other variations.

In particular embodiments, such as those shown in FIGS. 3-5 and 11-13, where a cavity 6C is arranged in the body 8 to receive a rod 6 extending through an aperture 6A, the cavity 6C is arranged along a bottom side 8S(B) of the body 8 intended to face and be installed adjacent to structure associated with the manhole, such as the cargo container 100 and more specifically its exterior wall 100W in accordance with the exemplary embodiment shown. In other variations, however, cavity 6C may be arranged on other sides of the body 8, such as the collar-facing side 8S(C), and may face other features of the manhole or cargo container, including manhole cover 0, collar 2, or any other component of the cargo container. In this way, when the locking device 1 is installed, the cavity 6C is closely arranged next to or adjacent to such structure, such that the cavity 6C is not sufficiently accessible to thereby resist any tampering with the rod 6 securement to the locking device 1. In the instance shown by example in FIG. 13, device 1 (as specifically identified in the figure) and its cavity 6C arranged along bottom side 8S(B) are arranged in close proximity or adjacent the cargo container 100 and its exterior wall 100W. In certain instances, the side of the body 8 (e.g., bottom side 8S(B)) along which cavity 6C is arranged (that is, where the cavity opening is arranged) is in close proximity or adjacent to any portion of the container or of the manhole (e.g., collar 2 or cover 0) when the bottom side 8S(B) or cavity 6C and its opening is located 0 to 4 inches from any such cargo container or manhole structure. Of course, this one example and other distances (greater or smaller) may be suitable in other variations to reasonably limit or prevent access to cavity 6C to provide tamper resistance. Accordingly, any such arrangement provides tamper resistance, since a potentially tampering party may not sufficiently access the cavity to disassemble the rod from its fixation to the locking device.

In particular embodiments, an exterior side of the body surrounding the aperture extending into the body (for receiving the rod) is biased relative to end side and manhole-facing (collar-facing) side of the body for the purpose of better configuring the locking device to conform an annular shape of the collar and manhole cover. With reference to the embodiment shown in FIG. 1-5, an exterior side 8S(A) of the body surrounding the aperture 6A extending into the body 8 is biased (that is, angled less than 90 degrees) relative to end side 8S(E) and manhole-facing (or collar-facing) side 8S(C) of the body 8. Body 8 also includes a bottom side 8S(B) intended to face elevationally downward, such as towards a cargo container 100 and the cargo container exterior wall 100W, in particular exemplary embodiments (see FIG. 13). Each exterior side of the body (e.g., 8S(E), 8S(A), 8S(C), 8S(B)) have surfaces associated therewith defining each side. Such surfaces may be planar (as shown) or otherwise as desired.

In particular embodiments, the locking device optionally include one or more sensors for detecting whether the locking device is locked and secured to the cargo container, and more specifically, the manhole cover and/or surrounding structure. Any suitable sensor may be employed and which may operate using any know principles for detecting or sensing. For example, the sensor may comprise a proximity sensor, magnetic sensor, pressure sensor, optical sensor, strain sensor, or position sensor. The one or more sensors may be arranged and configured to sense any connection with the locking device (e.g., rod and aperture/cavity) and/or any securement of structure within the locking device (e.g., the latch and manhole cover handle). In the embodiment shown in FIGS. 3-5, a sensor 21 is secured within body 8 using a nut 22, which is positioned internally to restrict access, which provides tamper resistance.

Figure 6:
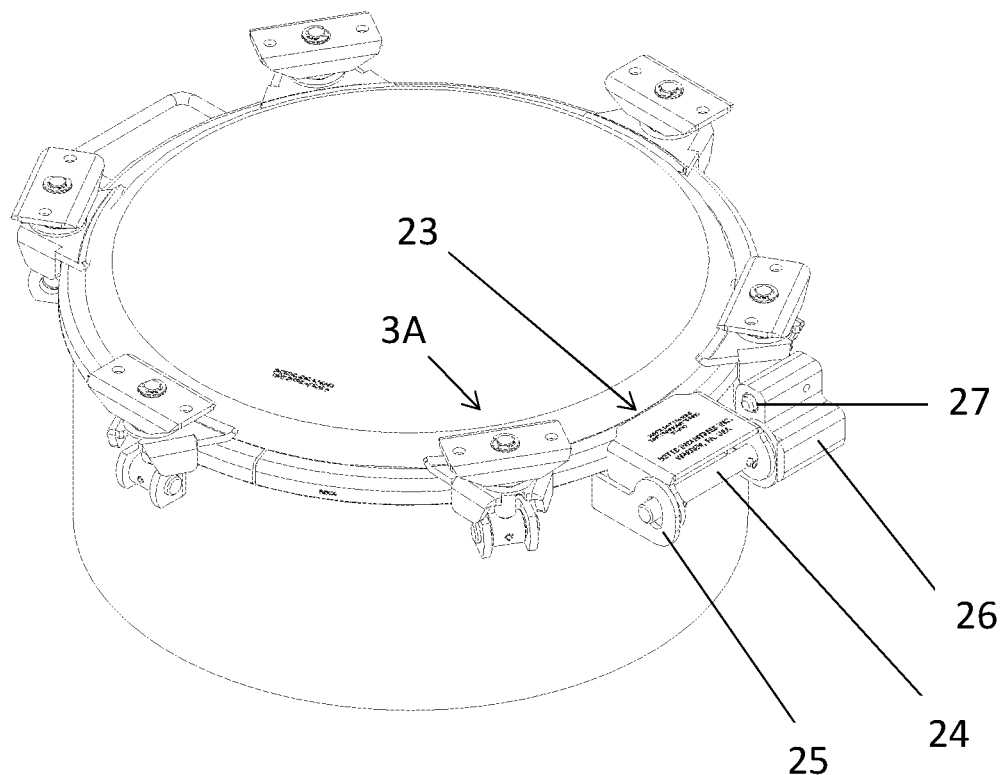
FIG. 6 is a top perspective view of a manhole with a manhole cover arranged in a closed position with a manhole cover locking device secured to a hinge bolt, the locking device arranged in an unlocked configuration relative to the hinge, in accordance with another embodiment.
Figure 7:
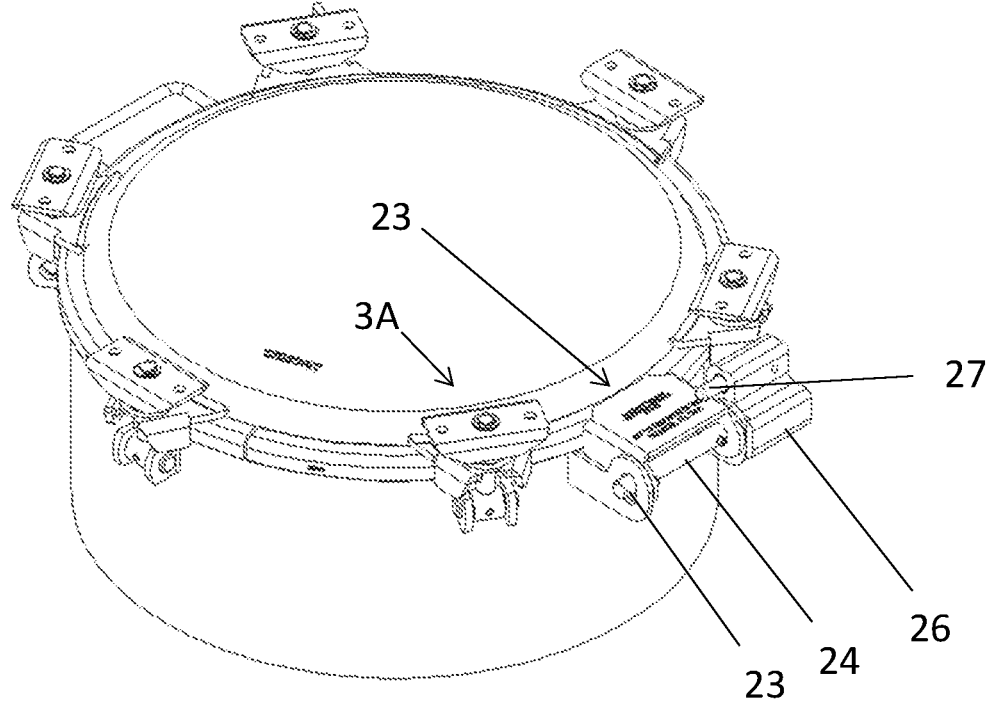
FIG. 7 is a top perspective view of a manhole with a manhole cover arranged in a closed position with a manhole cover locking device secured to a hinge bolt, the locking device arranged in a locked configuration relative to the hinge, in accordance with the embodiment shown in FIG. 6.
Figure 8:
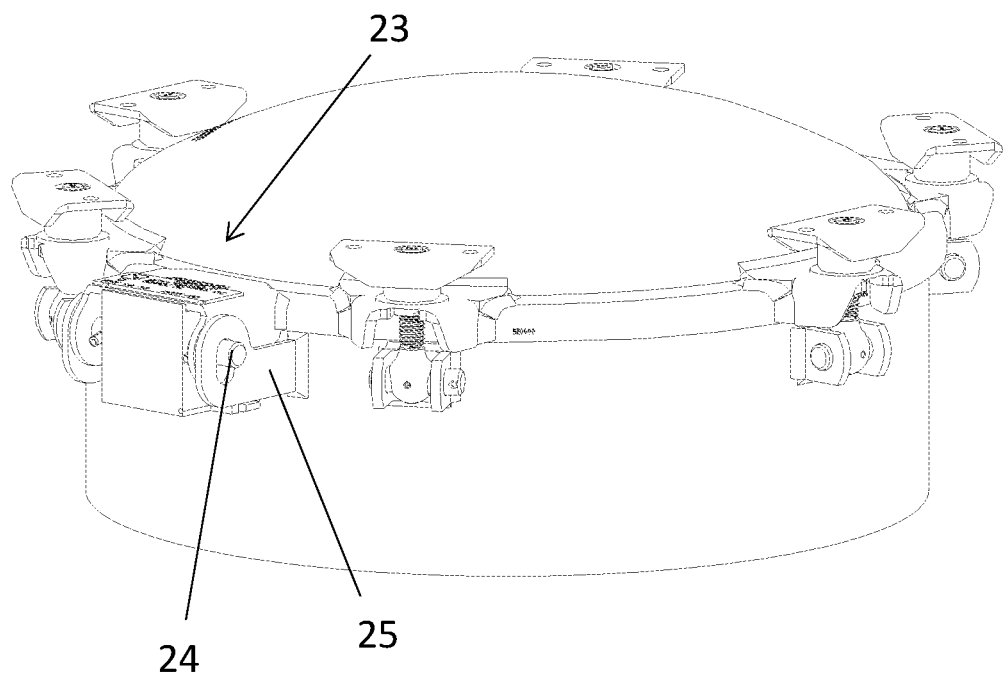
FIG. 8 is a top perspective view of the manhole with a manhole cover arranged in a closed position of FIG. 6 without the manhole cover locking device, shown in an alternative perspective view, in accordance with another embodiment.

As discussed above, with reference to FIGS. 3-5, 11, and 12, the aperture 6A and cavity 6C are configured to receive a rod 6. In such instances, the rod is a rod 6 extending through two or more lugs 4 associated with a manhole cover closure system, such as shown in FIGS. 1-2, by example, where the rod 6 is referred to as a swing bolt pin (which extends through a sleeve 3 to form a swing bolt for securing the manhole cover in a closed position to cover and seal the manhole opening). In other certain instances, such as with reference to another embodiment of the manhole cover locking device 26, the rod is a rod 24 extending through two or more lugs 25 associated with a manhole cover hinge 23, such as is shown in FIGS. 6 and 8, by example, where the rod 24 is referred to as a hinge bolt. In any such instance, the lugs 4, 25 extend from the collar and/or manhole cover, and include a recess or aperture for receiving the corresponding rod. The rod may be the original rod, a retrofit rod, or a substitute rod, the rod being suitable for use with the locking device as described herein. In the embodiment shown in FIGS. 6-8, the manhole cover locking device 26, which is secured to an end of rod 24, has a piston 27 that extends and retracts from the body of device 26, where in an extended position piston 27 overtop the structure of hinge 23 prevents the hinge 23 from opening due to mechanical interference (see FIG. 7) and in the retracted piston 27 permits the opening of the hinge and the manhole cover (see FIG. 6). Piston 27 may operate in the same fashion as piston 18 or as otherwise contemplated herein in other variations.

It is appreciated that that a manhole locking device may comprise any combination of the different features, mechanisms, and components of any manhole locking device or installation described herein. Moreover, any such manhole locking device or installation may be provided as a system or kit to use with any existing manhole, in any assembled or disassembled form. In doing such, the rod as described herein may be used to retrofit any current manhole by using the rod to replace the swing bolt pin or the hinge bolt. Further, the installation (which includes retrofitting) and/or use of any manhole cover locking device may be expressed and claimed as a method of installation or use.

Particular exemplary embodiments comprise a manhole cover locking device configured for locking a manhole cover in a closed position overtop an access opening of a container, the access opening being arranged at one end of a collar extending outwardly from the container, the device comprising: a body; a mechanism for connecting the body to a pre-existing portion of the manhole collar or the container; and, a mechanism for securing the body to the manhole cover to prevent the opening of the manhole cover using a pre-existing portion of the manhole cover. In certain embodiments, each mechanism is tamper resistant when the locking device is installed with each mechanism being arranged in a secured position. In certain embodiments, the system is installed on a manhole cover and collar associated with a cargo container to lock the manhole cover in a closed position.

In certain variations, the mechanism for connecting the body to the pre-existing portion of the manhole collar or the container comprises a rod, the body being configured to securely connect to the rod.

In particular embodiments, the body includes an aperture for receiving an end of the rod to securely connect to the rod to the body, the device further including a mechanism for securing the rod within the aperture. In certain instances, for example, the mechanism for securing the rod within the aperture is a pair of nuts, each nut of the pair of nuts being arranged on opposing sides of the aperture, where one nut of the pair of nuts is arranged in a cavity in communication with the aperture, the cavity extending into the body from a side of the body intended to face the manhole collar, manhole cover, or a wall of the cargo tank container when the device is installed.

In yet other embodiments, the rod extends from one or more lugs connected to the collar.

In yet other embodiments, a castle nut and pin are arranged on the and configured to securely position the rod in a desired position relative to the one or more lugs connected to the collar, where the pin is configured to be inserted through a hole in the rod and a pair of opposing recesses arranged along one end of the castle nut. In certain examples, the one or more lugs are associated with a manhole cover closure system. In other examples, the one or more lugs are associated with a manhole cover hinge.

In any of the embodiments disclosed, the mechanism for connecting the body to the pre-existing portion of the manhole collar or the container may comprise a latch, where the device further includes a latch locking mechanism movable between a latch locked position and a latch unlocked position. In certain embodiments, the latch is pivotably arranged within the body, the latch being pivotable between an open and unsecured position and a closed and secured position. In certain embodiments, the latch has a U-shaped portion configured to receive a cross-section of the portion of the manhole cover. In certain embodiments, the latch locking mechanism comprises a piston providing a mechanical interference with the latch in the locked position.

In any of the embodiments disclosed, the pre-existing portion of the manhole collar or the container may comprise a handle of the manhole cover.

In any of the embodiments disclosed, the device further comprises one or more collar-engaging members configured to extend from the body and forcefully engage the collar one or more set screws configured to engage the collar. In certain embodiments, the one or more collar-engaging members comprise one or more set screws.

In any of the embodiments disclosed, the rod may be a swing bolt pin or a hinge bolt.

In any of the embodiments disclosed, the body may be configured to receive a sensor configured to determine when latch is in open and closed positions.

Other embodiments of this disclosure comprise a manhole cover locking system configured for locking a manhole cover in a closed position overtop an access opening of a container, the access opening being arranged at one end of a collar extending outwardly from the container, the system comprising: a body; a mechanism for connecting the body to a pre-existing portion of the manhole collar or the container; and, a mechanism for securing the body to the manhole cover to prevent the opening of the manhole cover using a pre-existing portion of the manhole cover. Variations and particular embodiments of this manhole cover locking systems include those variations described in association with the manhole cover locking device as described herein.

A manhole cover locking kit for locking a manhole cover in a closed position overtop an access opening of a container, the access opening being arranged at one end of a collar extending outwardly from the container, the device comprising: a body; a mechanism for connecting the body to a pre-existing portion of the manhole collar or the container; and, a mechanism for securing the body to the manhole cover to prevent the opening of the manhole cover using a pre-existing portion of the manhole cover. Variations and particular embodiments of this manhole cover locking kit include those variations described in association with the manhole cover locking device as described herein.

A method of installing any manhole cover locking device, system, or kit as described herein for locking a manhole cover in a closed position overtop an access opening of a container, the access opening being arranged at one end of a collar extending outwardly from the container, the method comprising the steps of: installing the locking device, system, or kit as described herein in an installed arrangement to maintain the manhole cover in a closed position. In particular instances, where in the installed arrangement the locking device, system, or kit is tamper resistant.

A method of using any manhole cover locking device, system, or kit as described herein for locking a manhole cover in a closed position overtop an access opening of a container, the access opening being arranged at one end of a collar extending outwardly from the container, the method comprising the steps of: locking the locking device, system, or kit as described herein in a locked arrangement to maintain the manhole cover in a closed position. In certain instances, the method includes the step of: unlocking the locking device, system, or kit as described herein from the locked arrangement to permit the opening of the manhole cover.

Other embodiments include any device, system, method, or kit described in this disclosure and corresponding drawings, and any contemplated variation or combination thereof.

To the extent used, the terms "comprising," "including," and "having," or any variation thereof, as used in the claims and/or specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the embodiments. Ranges that are described as being "between a and b" are inclusive of the values for "a" and "b" unless otherwise specified.

While various improvements have been described herein with reference to particular embodiments thereof, it shall be understood that such description is by way of illustration only and should not be construed as limiting the scope of any claimed invention. Accordingly, the scope and content of any claimed invention is to be defined only by the terms of the following claims, in the present form or as amended during prosecution or pursued in any continuation application. Furthermore, it is understood that the features of any specific embodiment discussed herein may be combined with one or more features of any one or more embodiments otherwise discussed or contemplated herein unless otherwise stated.

We claim the following:

1. A manhole cover locking system comprising:
    a manhole with a cover pivotable about a hinge between open and closed positions and having at least one latch operable to secure the cover after the cover is placed in the closed position,
    a locking assembly having a body that is provided at a predetermined position in relation to the manhole cover,
    the locking assembly including a locking mechanism associated with the body operable between locked and unlocked conditions, such that the locking mechanism in the locked condition prevents movement of the cover from a closed position irrespective of the operation of the at least one latch, wherein the cover can only be opened upon actuation of the locking mechanism to the unlocked condition separately from the operation of the at least one latch.

2. The manhole cover locking system of claim 1, where the locking assembly is retrofit to an existing manhole and manhole cover by attachment at the predetermined position in relation to the existing manhole and manhole cover.

3. The manhole cover locking system of claim 1, where the locking assembly is integral with a manhole and manhole cover.

4. The manhole cover locking system of claim 1, further comprising an actuator to operate the locking mechanism between the locked and unlocked conditions.

5. The manhole cover locking system of claim 1, where the locking assembly is attached to a portion of the manhole by connections that impart a force on the locking assembly such that tension is placed on the connections to maintain the attachment of the locking assembly to the portion of the manhole.

6. The manhole cover locking system of claim 1, where the locking mechanism in the locked condition mechanically engages a portion of the manhole or manhole cover to prevent pivoting movement of the manhole cover about the hinge.

7. The manhole cover locking system of claim 1, where the locking assembly body is mounted in association with at least one latch of the manhole.

8. The manhole cover locking system of claim 1, where the position of the locking mechanism is adjustable.

9. The manhole cover locking system of claim 1, where the locking mechanism is operated between the locked and unlocked conditions by a source selected from the group consisting of a pressurized air source, magnetic source, electronic source, pneumatic source or a combination thereof.

10. The manhole cover locking system of claim 1, where the locking assembly includes a sensor to provide an indication of whether the locking mechanism is in the locked or unlocked condition.

11. The manhole cover locking system of claim 1, where the locking mechanism is remotely controlled to be switched between the locked or unlocked condition.

12. A manhole cover locking system kit comprising:
    a secondary locking system including a body and attachment system for attaching the body to a manhole in a predetermined position in relation to a manhole cover that is movable between open and closed positions and securable in the closed position by a latching system, the secondary locking system having a locking mechanism operable between locked and unlocked conditions where in the locked condition, the locking mechanism prevents movement of the cover from a closed position after the cover is placed in the closed position, and the secondary locking system having an actuator to operate the locking mechanism between the locked and unlocked conditions.

13. The kit of claim 12, further comprising a sensor to provide an indication of whether the locking mechanism is in the locked or unlocked condition.

14. The kit of claim 12, where the actuator of the locking mechanism of the secondary locking system is remotely controlled to place the locking mechanism in the locked or unlocked condition.

15. The kit of claim 12, where the secondary locking system is attached in association with at least one latch of the latching system associated with the manhole.

16. The kit of claim 12, where the attachment system allows adjustment of the position of the locking mechanism of the secondary locking mechanism.

17. The kit of claim 12, where the locking mechanism is positioned in relation to the cover of the manhole to mechanically interfere with opening the cover in the locked condition.

18. The kit of claim 12, where the attachment system imparts a force between the secondary locking system and portion of the manhole such that tension is placed on the connections to maintain the attachment of the secondary locking system to the portion of the manhole.

19. A method of operating and locking a manhole cover to prevent tampering comprising:
in association with a manhole with a pivotable cover positionable between open and closed positions, moving the cover to the closed position,
operating a first locking mechanism to secure the cover after the cover is placed in the closed position,
operating a second locking mechanism operable between locked and unlocked conditions to the locked condition after the cover is secured in the closed position by the first locking mechanism, where the second locking mechanism prevents opening of the closed cover to maintain the cover in the closed position independently from the first locking system, and to open the cover, operating the second locking mechanism to the unlocked condition, and operating the first locking mechanism to unsecure the cover and allow the cover to be opened.

20. The method of claim 19, where the second locking mechanism has an actuator that is remotely controlled to switch the second locking mechanism between the locked or unlocked conditions.

21. The method of claim 19, where at least one sensor is provided with the second locking mechanism to provide an indication of whether the second locking mechanism is in the locked or unlocked condition.

* * * * *